Patented Nov. 6, 1923.

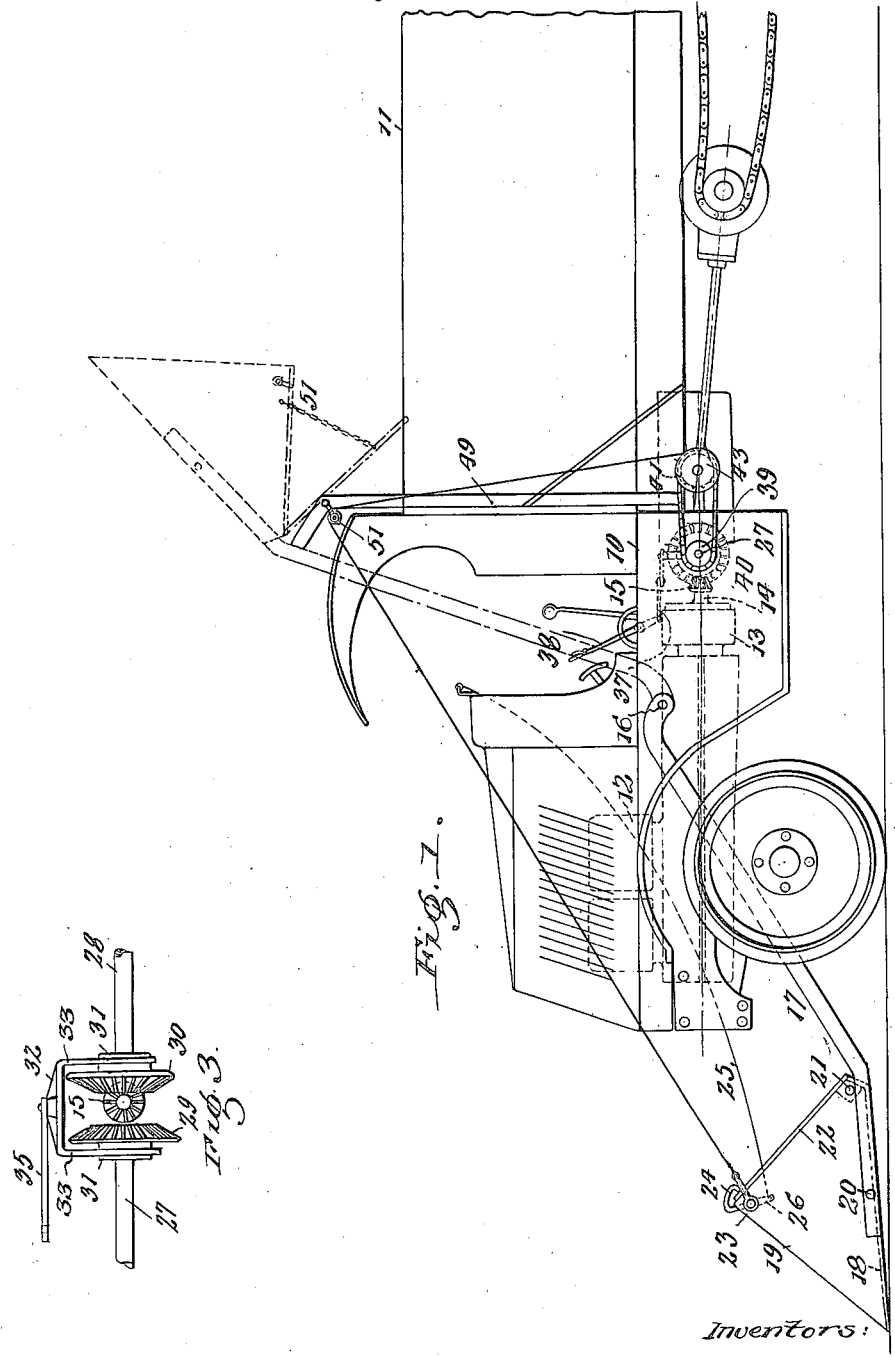

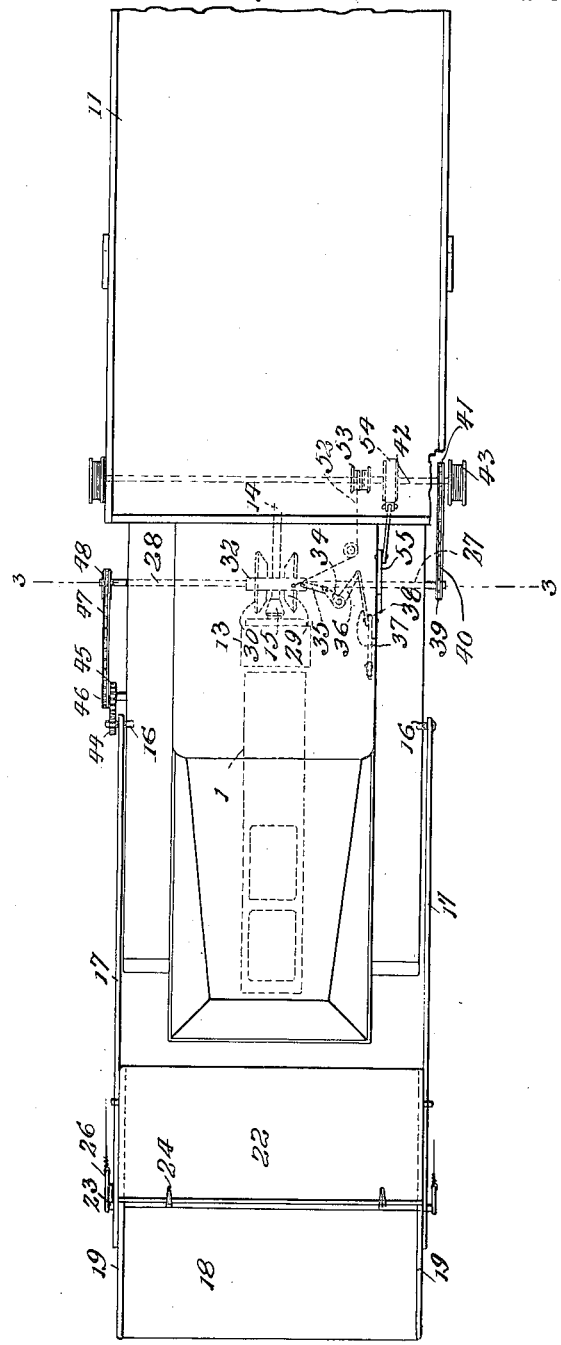

1,473,109

UNITED STATES PATENT OFFICE.

FRANK LIBERTINI AND ALPHONSO SAVENO, OF FAIRVIEW, NEW JERSEY.

TRUCK-LOADING SCOOP.

Application filed April 22, 1921. Serial No. 463,687.

*To all whom it may concern:*

Be it known that we, FRANK LIBERTINI and ALPHONSO SAVENO, both subjects of the King of Italy, LIBERTINI having declared his intention to become a citizen of the United States, residing at Fairview, in the county of Bergen and State of New Jersey, have invented certain new and useful Improvements in Truck-Loading Scoops, of which the following is a specification.

This invention has relation to loading devices and has for an object to provide an attachment for a motor truck consisting of a scoop to rest upon the ground and gather up a quantity of material during forward movement of the truck and means to elevate the scoop to deposit its contents by gravity into the truck body.

In addition to the foregong this invention comprehends improvements in the details of construction and arrangement of parts to be hereinafter described and particularly set forth in the appended claims.

In the accompanying drawings in which similar and corresponding parts are designated by the same characters of reference throughout the several views in which they appear, Figure 1 is a view in side elevation of a truck illustrating the embodiment therein of my invention.

Figure 2 is a view thereof in top plan, and

Figure 3 is a transverse section taken on the line 3—3 of Figure 2.

With reference to the drawings 10 indicates the chassis of a truck, 11 indicates the body and 12 the engine having the clutch 13 and shaft 14 upon which a pinion, forming part of my invention is mounted as indicated at 15. Shafts 16 extend transversely of the vehicle projecting beyond the sides, and mounted on each shaft is an arm 17, said arms extending normally beyond the front end of the truck and carrying therebetween a scoop consisting of the rectangular bottom plate 18 and triangular sides 19. Trunnions 20 project at the ends of the scoop and enter openings in the arms 17 thus mounting the scoop for pivotal movement, said movement being limited by the stop pins 21 mounted on the side members of the scoop and which engage the arms. A gate is provided consisting of a plate 22 which is pivoted at the rear edge of the bottom plate 18 and engages the sloping edges of the side members 19. A transverse shaft 23 is mounted in the side members and carries hook members 24 which normally engage the edge of the gate 22 to hold the same in closed position, said hook members being releasable by a cord 25 which is connected to an arm 26 mounted at one end of said shaft 23.

A pair of shafts 27 and 28 are mounted in the chassis in alignment and at right angles to the shaft 14. Mounted upon the inner end of each shaft section is a bevel gear indicated at 29 and 30 respectively. Each gear formed with a central grooved extension 31 and an inverted U-shaped yoke 32 embraces the gears and is provided with bifurcated terminals 33 which enter the grooves of the extensions 31. A bell-crank is mounted in the chassis and one arm 34 thereof connected by means of a link 35 to the yoke 32. The other arm 36 of the bell-crank is connected by means of the link 37 to the lower end of a lever 38. The outer end of the shaft section 27 carries a sprocket wheel 39 around which a chain 40 is passed, the latter also embracing a sprocket wheel 41 mounted upon one end of a shaft 42 which is journaled in the chassis transversely thereof. Each end of the shaft 42 carries a drum 43. The outer end of the shaft section 28 carries a sprocket 48 which drives a sprocket 46 journaled on the side of the chassis by means of the chain 47, said sprocket also carrying a gear wheel 45 which meshes with a gear 44 mounted to rotate with one of the stub shafts 16. A pair of standards 49 are erected, one at each side of the body 11 and each standard carries a pair of pulleys 51. A cable 52 is wound around each drum and the free end passed through the pulleys 51 and then connected to the ends of the rod 23 of the scoop.

In operation the truck is moved forward under its power and material upon the ground thus scraped up upon the scoop. When the latter is full the lever 38 is manipulated to bring the gear 29 into meshing engagement with the pinion 15. The transmission of the chassis will be in neutral position; and by letting in the clutch power will be transmitted from the engine through the shaft section 27 and chain 40 to the shaft 42. The drums will wind up the cables and as a result elevate the scoop to a position over the vehicle body 11. The cord 25 is now pulled to release the gate 22 which will fall under the weight of the contents of the scoop precipitating the latter into the vehicle body.

To restore the scoop to its normal position in front of the truck the lever 38 is shifted to bring the other gear 30 into mesh with the central pinion 15 whereupon the motion of the prime mover is transmitted through the shaft section 28 to the sprocket and chain drive 47, 48. This mechanism operates the meshed gears 44 and 45, said gear 44 being mounted on the shaft 16 to which the arms 17 are connected. This operation swings the arms and scoop forwardly and downwardly. It will be noted that when the scoop is in its uppermost or raised position, the same may rest upon the upper end of the standard 49 at which position, the arms 17 will have reached their maximum, rearward position, since at this point the cable 52 is fully wound upon the drum 53. As a result the yoke will be shifted unmeshing the pinion 15 and gear 29 and further application of power to elevate the arms 17 will cease. By mounting a brake band and drum 54 upon the shaft 42 controlled by means of the lever 55 the scoop may be stopped and held in any position. Thus, it will be seen that I have provided a novel arrangement designed to be embodied in a motor truck of conventional type which will facilitate the loading thereinto of sand, earth and other material and result in the saving of a great amount of time and labor. Other advantages will readily occur to those familiar with loading devices.

While we have illustrated and described our invention with some degree of particularity, we realize that in practice various alterations therein may be made. We therefore reserve the right and privelege of changing the form of the details of construction or otherwise altering the arrangement of the correlated parts, without departing from the spirit of the invention or the scope of the appended claims.

Having thus described our invention, what we claim as new and desire to secure by United States Letters Patent is:—

1. In combination a truck, power operating mechanism, a transverse operating shaft, gearing for driving the shaft from the power operating mechanism, means for reversing the operation of the shaft, stub shafts, means for rotating said last mentioned shafts, a pair of forwardly and downwardly extending arms attached to the last mentioned shafts, a scoop carried by the front ends of the arms and forwardly of the truck, a gate mounted on the scoop, a pair of standards on the truck, a cable winding mechanism including pulleys on the standards for elevating the scoop, said standards supporting the scoop at its extreme upper or dumping position.

2. In combination, a truck, power operating mechanism, a transverse operating shaft, sprocket and chain gearing for driving the shaft from the power operating mechanism, shifting means for reversing the operation of the shaft, stub shafts, rotatable from the first mentioned shaft, a pair of parallel, forforwardly and downwardly extending arms attached to the stub shafts, a triangular scoop carried by the front end of the arms and forwardly of the front, a hingedly connected gate mounted on the scoop, a pair of vertical standards on the truck, a cable winding mechanism including pulleys on the standards for elevating the scoop, said standards supporting the scoop at its extreme upper or dumping position and means for operating the gate from its normally closed to its open position.

In testimony whereof we affix our signatures in presence of two witnesses.

FRANK LIBERTINI. [L. S.]
ALPHONSO SAVENO. [L. S.]

Witnesses:
 ALFONSO SAVIANO,
 CARMINE DE SENA.